United States Patent [19]

Rogers

[11] 4,051,918
[45] Oct. 4, 1977

[54] SEISMIC ENERGY SOURCE
[75] Inventor: Joe M. Rogers, Houston, Tex.
[73] Assignee: Applied Research & Development Company, Houston, Tex.
[21] Appl. No.: 578,255
[22] Filed: May 16, 1975
[51] Int. Cl.² ............................................. G01V 1/04
[52] U.S. Cl. .................................. 181/119; 181/114; 181/401
[58] Field of Search ............... 181/113, 114, 116, 117, 181/119, 401

[56] References Cited

U.S. PATENT DOCUMENTS

| | | | |
|---|---|---|---|
| 3,034,595 | 5/1962 | Thompson | 181/116 |
| 3,206,936 | 9/1965 | Moor | 181/114 |
| 3,752,242 | 8/1973 | Gremillion | 175/108 |
| 3,885,646 | 5/1975 | Knight et al. | 181/114 |
| 3,976,161 | 8/1976 | Carman, Jr. | 181/401 |

FOREIGN PATENT DOCUMENTS 1,119,931  4/1956  France

*Primary Examiner*—Howard A. Birmiel
*Attorney, Agent, or Firm*—Donald Gunn

[57] ABSTRACT

A seismic energy source which incorporates multiple augers and a rotary mechanism therefor mounted on a vehicle, the auger incorporating an internally situated seismic shock wave source which creates shock waves passing through a window in the auger into the soil. The shock wave source incorporates a chamber which stores compressed air and a valve mechanism which releases the air sharply for a short interval to create a shock wave in the soil.

7 Claims, 8 Drawing Figures

SEISMIC ENERGY SOURCE

BACKGROUND OF THE INVENTION

Exploration for oil and gas requires testing of the earth's substructure by seismic techniques. Seismic sources of great variety have been used in the past. For instance, the explosion of a small charge buried 10 or 20 feet deep has been used for many years in the seismic industry. Explosives, of course, are dangerous in handling and their use has in large extent been supplanted by other techniques. Other techniques include the dropping of a large weight on the surface. Freefall weights were proposed many years ago in the patents of Burton McCollum. The use of an explosive mixture of air and combustible gases filling an inverted dome has likewise been used. Another technique is the generation of a frequency sweep where a loud speaker is effectively coupled with the soil. The Vibroseis of the Continental Oil Company is representative of this type of equipment.

The apparatus of the present invention is believed to provide a substantial improvement over seismic sources mentioned above. The apparatus of the present invention is able to obtain subsurface coupling similar to that of explosive charges. However, it does not have the danger or problems of handling which are normally associated with explosives. It is more rapid in use and operation because it can be triggered repetitively. By contrast, explosive charges must be positioned and ignited which is a sequency of events requiring some time. The apparatus of the present invention is particularly adapted for use in areas of changeable topography. It is adapted to be used in marshes and swamps where seismic shock point will be on dry land, the next under water, the next in sand, and so on.

As background for the seismic source of the present invention, references is made to U.S. Pat. No. 3,639,752 which discloses several forms of a seismic source. The patent discloses what will be described as a pneumatic sonic source. In general, the patent discloses the use of a chamber which accumulates air under very high pressure. An external port or window is closed by a valve member. The valve is triggered for a short interval, exposing the port, and permitting air to escape through the port. The valve is subsequently closed, interrupting flow from the port. The air rushes through the window or port creating noise as it flows, and forming a shock wave. It typically contemplates pressures as high as 5000 or 6000 psi with a drop to about 2000 psi on discharge. The apparatus can be rapidly recharged through the use of an air compressor to create another shock wave.

SUMMARY OF THE PRESENT INVENTION

The present invention is a vehicle mounted seismic source utilizing an auger and a power source for driving the auger. A mast is erected above a tractor and includes a traveling head. The head supports a drive motor for a gear train connected to an auger. The auger drills into the ground on rotation and advancement by moving the head along the mast. The auger drills into the earth to position a seismic energy source in intimate contact with the soil. An electrical signal is applied through a rotating swivel to actuate the air gun. A seismic shock wave is created at the port or window of the air gun and the seismic energy passes through a port or window cut in the sidewall of the auger. The swivel incorporates a pneumatic line which extends from a point remote from the auger where it is connected with an air compressor to the air gun. The preferred embodiment incorporates dual augers which are summetrically mounted on a travelling head, and dual air guns in each to increase the seismic shock amplitude.

DESCRIPTION OF THE PREFERRED EMBODIMENTS

Figure 1:
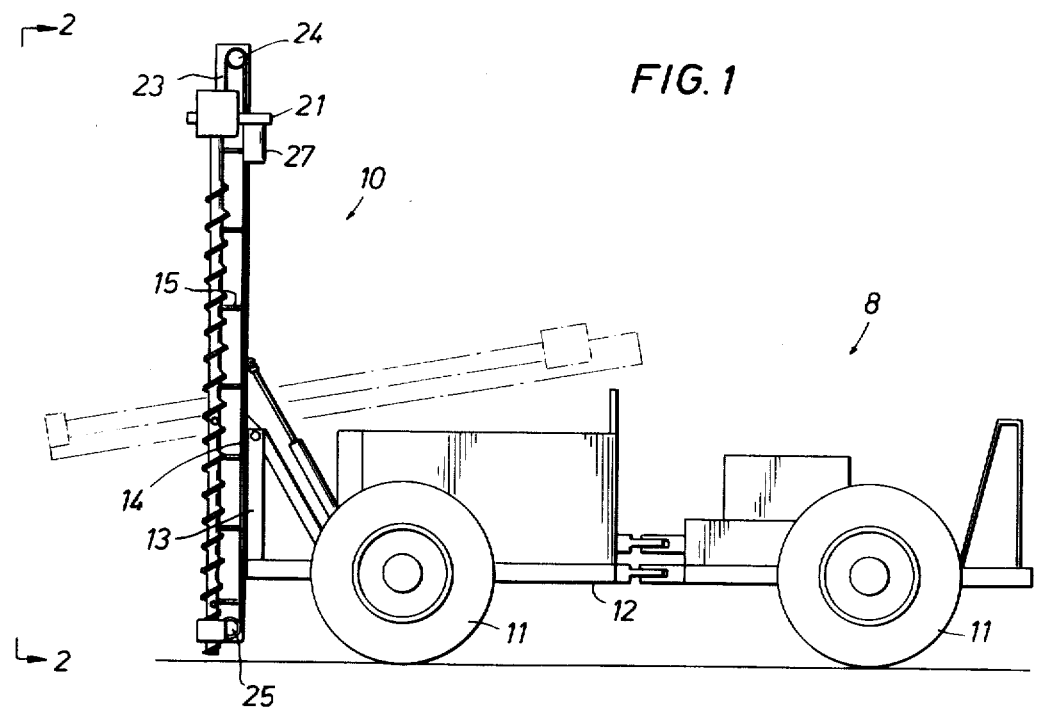
FIG. 1 is a side view of the seismic energy source of the present invention mounted on a vehicle for locomotion in any terrain and showing in dotted line a storage position of the auger and associated equipment, which is, in the full line position, prepared to drill into the soil.

Attention is first directed to FIG. 1 of the drawings where a vehicle 8 supporting the seismic energy source 10 of the present invention. The vehicle 8 is typically a motor powered vehicle which carries a driver and an air compressor. It is typically a vehicle which is equipped with large balloon tires 11 so that it may travel on land or in swampy areas. It has a framework 12 which supports the seismic source 10 of the present invention. The framework 12 extends forwardly to an upright member 13 supporting a pivot shaft 14 which is connected by a protruding tab to a fabricated mast 15. The mast 15 is substantially tall. The mast 15 is pivoted around the shaft 14 in response to the urging of a hydraulic cylinder 16 (see FIG. 2) which has a piston rod 17 extending from it and connected to a frame member 18 which comprises a portion of the mast 15. The hydraulic cylinder 16 is duplicated on both sides of the apparatus. The hydraulic cylinder 16 is anchored at its lower end to the frame 12. Retraction of the piston rod 17 pulls the mast 15 from a generally vertical posture to a position approximately horizontal. This lowers the mast so that the vehicle 8 can pass under power lines and for other reasons.

In the erect position, the mast 15 is perpendicular to the frame to position an auger 20 for drilling into the soil. The apparatus is symmetrically constructed so that two augers are preferably incorporated. They are similar to one another except that they are provided with opposite hand helical flites. A description of one will suffice for the other except for the opposite handed arrangement of the flites.

The mast 15 supports a travelling crosshead 21. It is a generally rectangular framework which has a central opening which matches the cross sectional shape of the mast 15. The crosshead 21 is positioned on the mast 15. The crosshead 21 travels up and down on the mast 15 to drive the augers 20 into the soil. Rotation is imparted from the crosshead as will be described.

Figure 2:
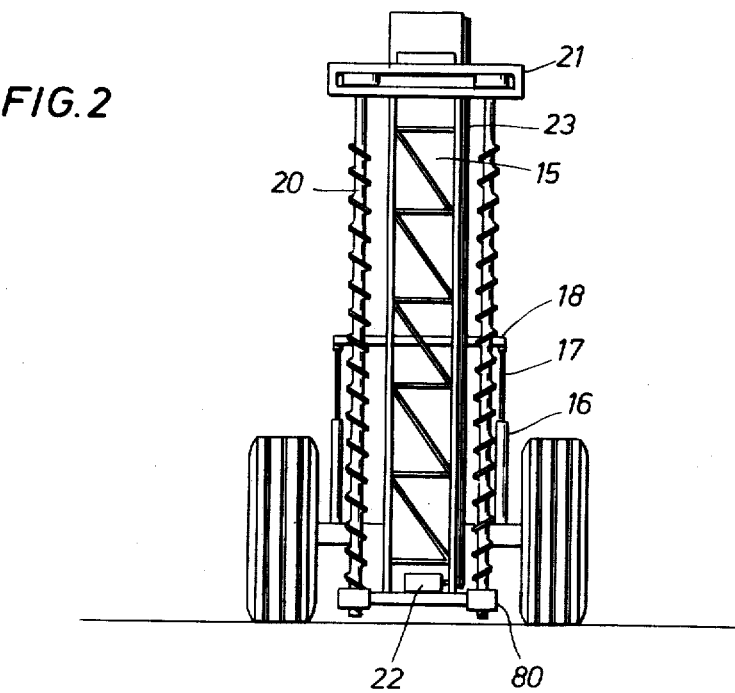
FIG. 2 is a front view of the vehicle shown in FIG. 1 showing a mast and crosshead supporting duplicate augers positioned for drilling into the soil.

The crosshead 21 has an uppermost position shown in FIGS. 1 and 2. A motor 22 is connected to a flexible chain or belt drive 23 connected to the crosshead 21. The motor 21 is at the bottom of the mast 15. It incorporates a drive shaft connected to a pulley or sprocket 25 engaged with the flexible member 23. The motor is powered, pulling the flexible member 23 and raising or lowering the crosshead 21. As shown in FIG. 1, the flexible member 23 passes over a pulley 24 at the top end and over a drive sprocket or pulley 25 at the lower end of the mast 15. The crosshead assembly 21 is connected to the flexible member 23 at one point. The flexible member 23 is looped between the pulleys or sprockets 24 and 25.

The crosshead assembly 21 carries a drive motor 27 which drives a small gear meshed with a larger gear 28. The gear 28 is found in FIG. 3. The crosshead assembly includes a gear housing 29 which encloses the gear 28. The housing 29 provides a base for supporting the motor 27. The motor 27 is preferably a fluid driven motor which can be rotated in either direction.

The housing 29 supports a cylindrical chamber 30. The chamber 30 has one opening for an electrical line 31 which provides signals to the air gun as will be described. It triggers the formation of a seismic shock. The line 32 is communicated from an air compressor reservoir to the air gun. The housing 29 and the chamber 30 are fixed in position. A tubular body 33 in the chamber 30 is also fixed and does not rotated.

Figure 3:
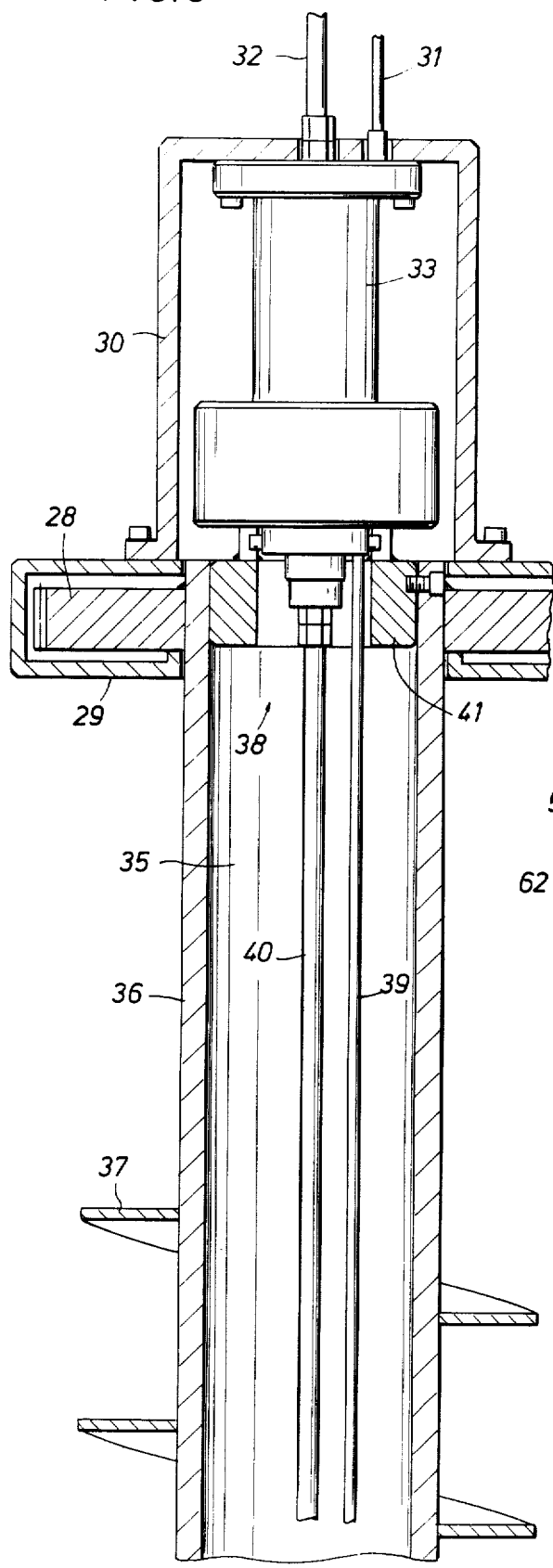
FIG. 3 is a sectional view along the diameter of the top end of the auger showing details of construction of the auger and a swivel for communicating air under pressure and electrical signals to the air gun located in the auger.

FIG. 3 shows the gear 28 in the housing 29 in a position for rotation which is imparted to the auger. The auger is preferably hollow having a central passage 35 and an outer shell of tubular construction at 36. The auger supports flites of a helix 37 on the tubular shell 36. The apparatus includes a swivel means generally indicated at 38 which provides electrical signals through a conductor 39 to the air gun below and air under pressure through a line 40. The swivel 38 thus includes an upper portion which is fixed or nonrotative and which is connected to the fixed housing 29 and the chamber 30 attached to that and having a lower portion which rotates along with the gear 28 and the auger 36. All of the apparatus on the interior of the auger 36 is rotatable. Thus, the gear 28 is preferably welded to the tubular shell 36 of the auger and a set screw joins the auger shell 36 to a bushing 41 below the swivel. The bushing 41 aligns the swivel.

Figure 4:
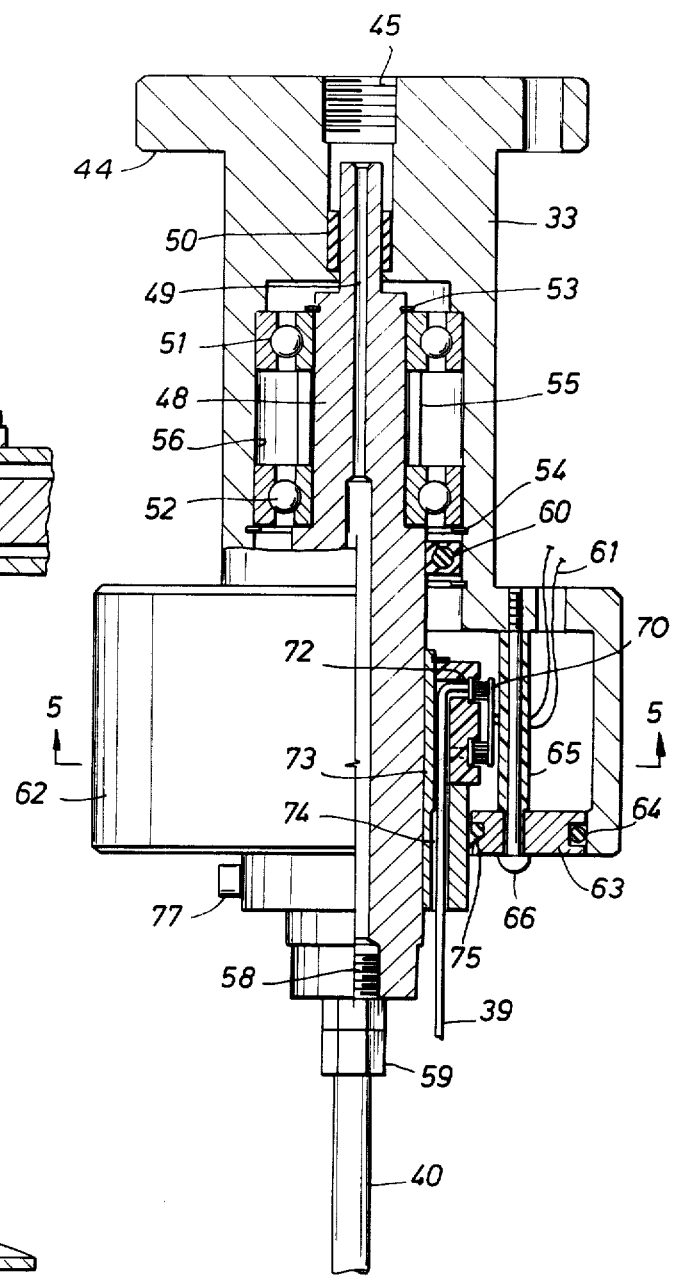
FIG. 4 is an enlarged sectional view through a swivel mechanism and the top end of the auger as shown in FIG. 3.

Attention is directed to FIG. 4 which shows in sectional view the structure of the swivel. The tubular member 33 includes a flange 44 having bolt holes arranged on a circle enabling it to be connected with the cylindrical housing 30. It is axially drilled with a threaded hole 45. The hole is adapted to be connected to a pneumatic line such as the line 32 previously mentioned. The tubular sub 33 incorporates a pneumatic passage therebelow. It is centrally hollow. A rotatable spindle 48 is axially located in the apparatus. It is hollow, having a passage 49 which opens at the top end of the spindle. The top end of the spindle is exposed to the tapped opening 45 so that air under pressure is communicated into the spindle passage 49.

The spindle 48 extends through a seal 50 which prevents leakage on the exterior of the spindle. The seal 50 is received in a counterboard hole extending from the tapped opening 45. It surrounds the neck of the spindle. The spindle itself is aligned by first and second bearing assemblies 51 and 52. They are held in position by appropriately located snap rings 53 and 54. The bearing assemblies 51 and 52 are spaced apart and held against the snap ring 53 and 54 by a sleeve 55 which surrounds the spindle 48. The tubular body 33 has a large central cavity or chamber 56 which receives the spindle, the bearing assemblies and other apparatus. The member 33 does not rotate but it supports the spindle 48 for rotation. The spindle is aligned by the bearing assemblies 51 and 52.

The spindle 48 is substantially long, and incorporates the axial passage 49 all the way to the lower end. The lower end is threaded at 58 to receive a fitting 59 connecting with the pneumatic line 40 below the spindle. The spindle 48 and the pneumatic line 40 rotates. The spindle is unable to drop out of the illustrated arrangement by the action of the snap rings 53 and 54. The weight of the spindle is carried on the bearing assemblies 51 and 52. If desired, the bearings can be permanently lubricated by placing grease therein and above a grease seal 60 which surrounds the neck of the spindle below the bearing assembly 52.

The numeral 61 identifies the electrical lines wnhich are input through the shielded conduit 31 previously named. The lines 61 pass through an opening in a communtator housing 62. The commutator housing 62 comprises an extension on the tubular member 33. The commutator housing is hollow and opens downwardly. It is circular. It is closed at the bottom by a circular disk 63. The disk 63 is sealed to the commutator housing 62 by an O-ring 64. Its vertical spacing is controlled by a hollow stand off post 65 which receives a head bolt 66, locking the plate 63 in position.

The hollow stand off post 65 supports a bracket 66 extending lengthwise of the spindle 48. The bracket 66 supports spring arms 67 and 68 better shown in FIG. 5. The arms 67 and 68 are preferably formed of conductive material such as copper or copper beryllium alloys. The conductors 61 are connected to the upper and lower flexible arms or brushes to transfer the electrical signals. A complete circuit requires two wires. Upper and lower brush assemblies are shown in FIG. 4. They are identical in construction and differ only in their location. The brush assemblies thus use the flexible arms 67 and 68 are shown in FIG. 5 to transfer signals to a conductive ring 70 through a brush block 71, carried at the end of the flexible brush arms.

Figure 5:
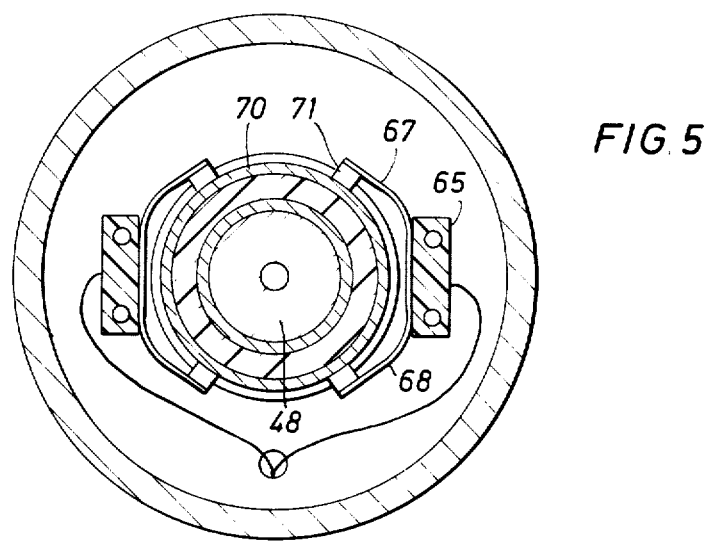
FIG. 5 is a sectional view along the line 5 — 5 of FIG. 4 showing details of construction of an electric commutator which delivers the firing signal to the apparatus.

The two conductors are connected to parallel brush assemblies on opposite sides of the spindle 48 as shown in FIG. 5. The conductive material 70 which rotates with the spindle 48 is supported by a nonconductive sleeve 73 having an encircling groove 72 formed in it. Two such grooves are formed opposite the flexible arm brush assemblies. The sleeve 73 has a lengthwise passage 74 for receiving the electrical conductor 39. The conductor or cable incorporates two wires, one of which is connected to the upper conductive ring 70 and the other being connected to the lower conducting ring. The passage 74 thus extends through the sleeve 73 to a point adjacent to the conductive ring where the conductors connected to the conductive rings.

Redundant commutators are provided on opposite sides of the spindle as shown in FIG. 5. Ordinarily, only two wires are communicated through the commutator assemblied described. Out of an abundance of caution, a redundent set of commutator brushes is incorporated. The disk 63 supports a downwardly facing seal ring 75 which contacts the exterior of the sleeve 73. It prevents entry of dirt and trash which may be found in the tubular shell 36 of the auger.

The sleeve 73 supports a pin 77 which aligns with an opening in the bushing 41 to align and position the two members for continued rotation together.

Figure 7:
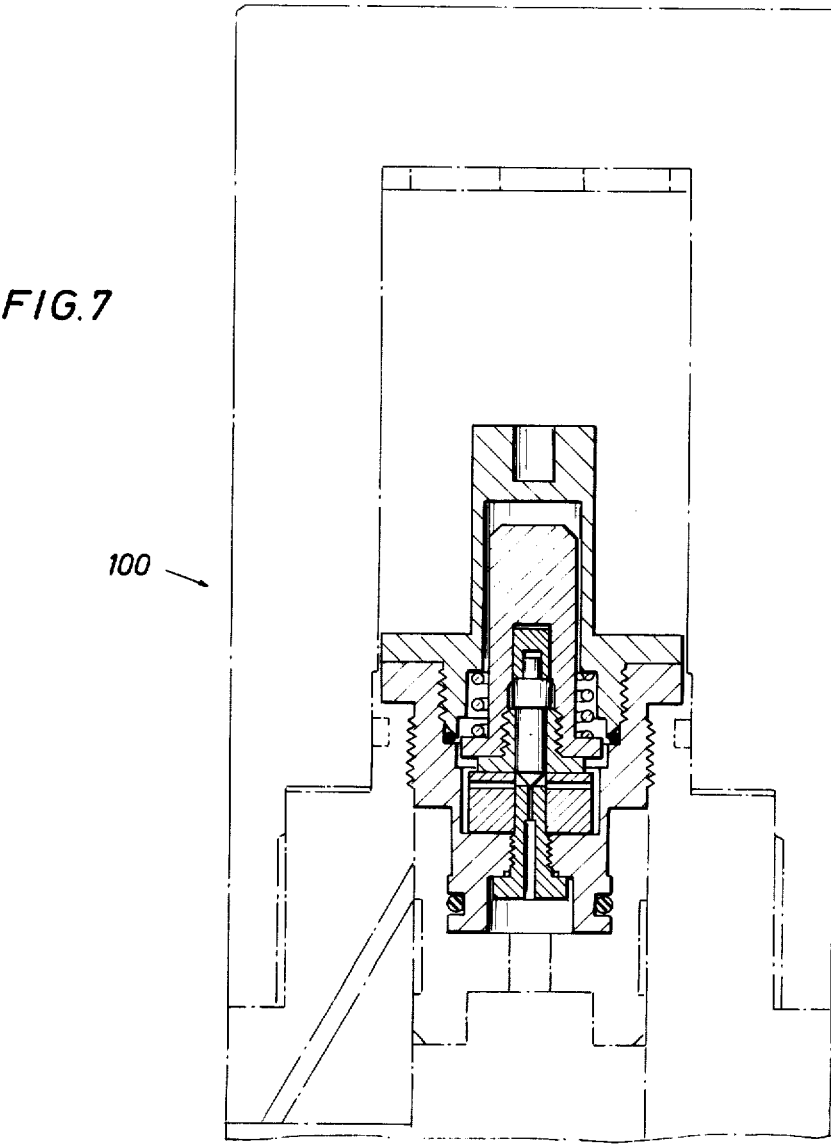

As described to this juncture, the swivel apparatus shown in FIGS. 3 and 4 delivers electrical signals over a conductor pair and air under pressure through a pneumatic line to a point in the auger which rotates. Attention is next directed to FIGS. 6A and 6B for a description of the air gun located therein. The air gun is supported in the tubular shell 36 which forms the auger. To this end, it is rested on the bottom end of the auger. In other words, the auger is closed across the bottom so dirt cannot intrude into it. The auger extends through a guide or eyelet 80 shown in FIG. 2. As the crosshead 21 is lowered, power from the motor 27 rotates the gear 28 (see FIG. 3) which rotates the tubular shell 36 from the auger causing it to drill into the soil. The auger thus is able to drill to a selected depth at the subsurface to position the air gun to be described. The air gun shown in FIGS. 6A and 6B incorporate a lower chamber 81 and an upper chamber 82. A description of the apparatus associated with the lower chamber will suffice for the upper chamber. The two function similarly. They are triggered simultaneously by means of the mechanism shown in FIG. 7 which will also be described. Air under pressure is introduced through the upper chamber 82 into a small passage 83 which raises the pressure level in the chamber 81 to a designated level. The pressure in the chamber 82 rises slowly because of the constriction in the passage 83 in comparison with the flow through a passage 84. The passage 84 communicates with a small chamber 85. The chamber 85 is pressurized to the level of the chamber 82 before the chamber 81. This time difference is a result of the relative volumes of the two chambers and the cross-sectional area of the passages to them. The chamber 85 thus is pressurized in advance of the chamber 81, causing a sleeve 86 to be forced out of the chamber 85. The sleeve 86 covers over a window or port 87. The port 87 is adjacent a matching or similar port 88 formed in the auger.

Figure 6A:
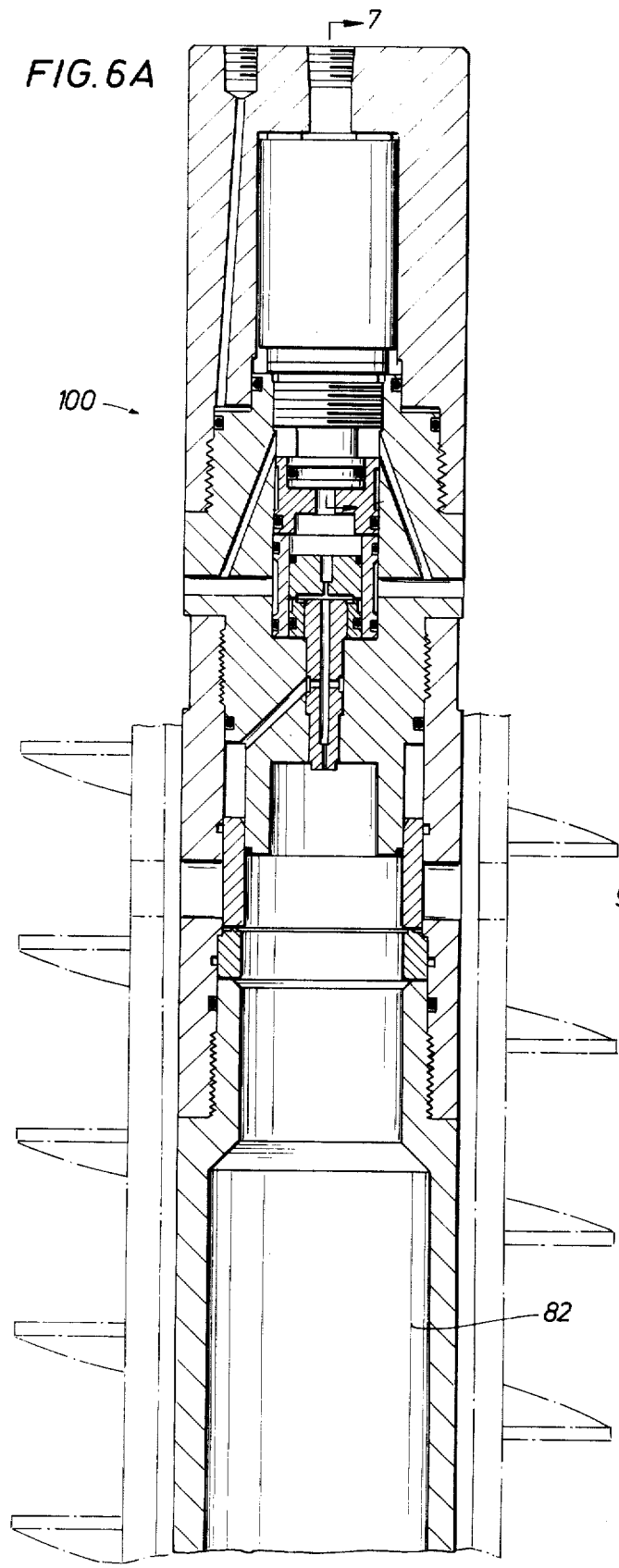
FIG. 6A shows the top end of an air gun having a valve mechanism and a chamber for storing air under pressure which creates a seismic shock wave at a window, there being a window in the surrounding wall of the auger.
Figure 6B:
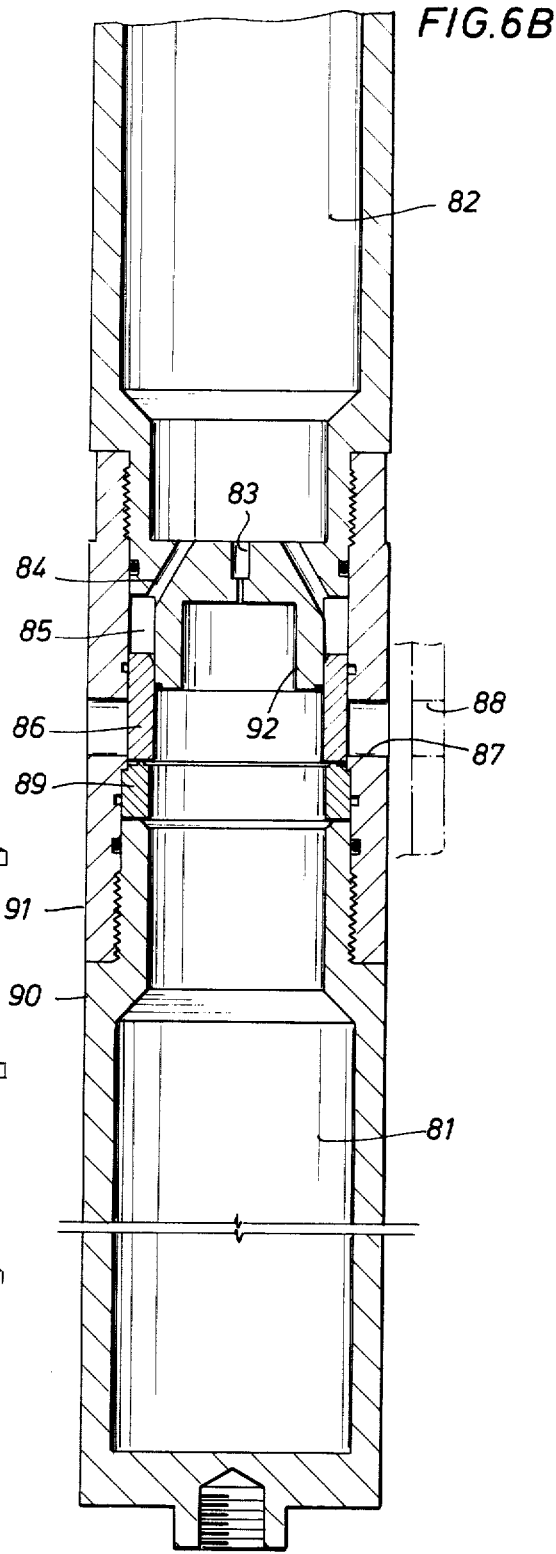
FIG. 6B shows the lower end of the air gun of FIG. 6A, the apparatus incorporating a second chamber and a second valve mechanism to provide dual air guns in a single housing; and, FIG. 7 is a sectional view of part of the valve mechanism taken along the line 7 — 7 of FIG. 6A.

The sleeve 86 is captured between seal members to isolate the chamber 85. The rapid increase in pressure in the chamber 85 forces the seal 86 downwardly. The sleeve lands on a lower sleeve 89 which is movably mounted. The sleeve 89 abuts the shoulder of a bottom tubular member 90 which is threaded to an outer tubular member 91 to comprise the illustrated housing. The tubular member 91 extends the exterior of the chamber 85. The chamber 85 is further defined by a concentric downwardly facing tubular appendance 92 which is closed by a transverse plate which is drilled with the passages 83 and 84 previously mentioned. The chamber 85 thus is on the exterior of the tubular appendance 92 and is on the interior of the tubular sleeve 91. Three seal members located as illustrated in FIG. 6B define the chamber 85.

The chamber 81 is sealed against through leakage to the exterior. The threaded connection between the members 90 and 91 is protected with a seal member. The lower sleeve 89 has a seal member on its exterior.

In operation, air under pressure in the chamber 82 is communicated to the chambers 81 and 85. For purposes of discussion, assume that the chamber 82 is filled to some suggested level such as 5000 psi. The speed with which the chamber 82 is filled and the level to which it is filled is not critical. In any case, the passage 84 communicated to the chamber 85 fills that chamber more rapidly than the chamber 81. This creates a pressure differential acting on the sleeve 86, keeping it in the closed position. At some point in time, the pressure in the chambers 81 and 85 equalizes. When this occurs, the sleeve 86 continues closed being kept in the closed position by friction against movement and the larger differential area exposed to pressure in the chamber 85 in comparison with the exposed differential area exposed to pressure in the chamber 81. In other words, the sleeve 86 is maintained in the closed position even after pressure equalizes.

The device is operated by releasing pressure upstream of the chambers 81 and 85. A small drop in the chamber 82 is communicated to the chamber 85 more rapidly than the chamber 81. When the drop occurs, the pressure differential acting across the differential in area of the exposed surfaces of the sleeve 86 forces the sleeve 86 upwardly. It is forced upwardly rapidly, opening in a matter of a millisecond or so. The sleeve 86 slams upwardly almost filling the chamber 85. It uncovers the port 87. Air in the lower chamber 81 escapes with a large noise. In a typical situation where the auger is well beneath the surface or indeed, in mud or mire, the blast of air through the port 87 clears the port of entering dirt. A noise is created and coupled into the earth. The noise continues so long as the sleeve 86 is in the up position. The sleeve is held in the up position until the pressure drop in the chamber 81 unbalances the forces maintaining the sleeve in the up position. At some point in time, the pressure in the chamber 85 exceeds the pressure in the chamber 81. This then creates an unbalanced forced acting on the sleeve 86, forcing the sleeve down closing the window 87, and ending the sonic noise created by the device. The sleeve closes with a slam cutting off continued flow of compressed air.

At this point, the sonic shock wave is terminated. The shock wave is coupled from the air gun through the port in the auger 88 into the soil. The sonic shock is coupled into the earth to subsurface formations for seismic prospecting.

The apparatus of the present invention is particularly useful in that dual air guns are stacked above one another utilizing the chambers 81 and 82. The upper air gun is shown in FIG. 6A. It functions in the same manner as the one shown in FIG. 6B. They differ, however, in that a valve mechanism generally indicated at 100 controls the triggering of the upper air gun. The lower air gun is triggered off the upper air gun. The upper air gun uses the same mechanism or apparatus, and begins emptying the chamber 82. When the pressure drop occurs in the chamber 82, it is communicated to the lower air gun, causing the valve on it to open. Thus, the two slide valves open almost instantly and simultaneously and continue to open for approximately the same interval to form a sonic shock wave emanating from both air guns. The sonic shock wave is coupled through opening or ports in the auger so that it may enter the soil.

The pneumatic line 40 and the electrical conductor 39 in the auger shown in FIG. 3 extend to the upper end of the air gun shown in FIG. 6A. Air for refilling the chambers 81 and 82 is supplied. An electrical signal controlling the start of the sonic shock wave is supplied over the conductor 39. The conductor 39 provides electrical signals to the valve mechanism 100 which open the valves. As in the case of the lower air gun, air is stored in the chamber 82 and in a chamber just above the slidable sleeve. The valve 100 vents an upstream chamber communicated with the chamber 82, creating a pressure drop. The sleeve again is moved to the up position because air above the sleeve is dropped in pressure faster than in the chamber 82. This triggers the upper valve in operation exposing the upper chamber through the port and creating a seismic shock wave.

The two air guns in a single auger are thus triggered simultaneously. They provide a larger seismic shock than can be achieved with one larger air gun. Moreover, the apparatus is shown in FIG. 1 to include two augers or is capable of incorporating up to four air guns which are triggered simultaneously. All of the air guns form a simultaneous shock wave which can be considered to emanate from a single point source when considering the scale of seismic exploration. The apparatus of the present invention is able to be recharged quickly. In a typical sequence of operation, the pressure in the chambers 81 and 82 may approximate 5000 or 6000 psi before dicharge. The discharge will drop the pressure to about 500 to 2000 psi. The chambers are recharged rapidly so that another shock wave can be initiated.

The apparatus of the present invention is particularly useful in areas of changing topography. For instance, it can be used in swamps and marsh lands, tidal basins and the like. It is particularly useful in enabling the operator to travel over difficult terrain forming the seismic shocks at the required locations with a minimum of effort and travelling on to another location. The seismic air gun is anchored in the auger to avoid vibration and reverbaration. To this end, the lower end of the air gun includes a threaded opening through which connection to the case or housing of the auger is accomplished. The auger is preferably opened through its full length but is closed across the bottom to prevent the intrusion of dirt and water. A gasket between the auger 36 and the air gun seals the area near the windows 88 in the auger.

In operation, the mast 15 is turned erect over a specified location. The motor 22 is operated to lower the auger against the ground. Power is applied to the motor 27 which rotates the auger 20. Rotation is imparted through the gear 27 shown in FIG. 3. The gear rotates the swivel mechanism, enabling a continual supply of compressed air to the air gun in the auger. The auger is rotated while the crosshead 21 is lowered, drilling into the earth and positioning the air guns below the surface of the earth. The hole is drilled until the ports or windows in the auger are below ground level. It is possible that some dirt might intrude through the port or window. However, a pliable gasket prevents the intrusion of excessive dirt between the air gun and the auger. After the hole has been drilled to the specified depth, an electrical signal is applied to the valve mechanism 100. This triggers the sleeve on the upper air gun and consequently triggers the sleeve on the lower air gun. They open almost simultaneously, forming a shock wave. The shock wave is terminated when the sleeves remove to the downward or closed position. The chambers 81 and 82 are then steadily refilled from the supply line. Another shock wave can be formed after a few seconds.

Any number of shock waves can be formed with the auger in a hole. The shock waves do not tend to enlarge or overly dig out the hole.

The apparatus can be quickly retracted from a given hole. For instance, the auger is rotated in the opposite direction and the crosshead 21 is raised. As soon as the auger clears the ground, the tractor 8 can be advanced to another location and another set of holes drilled. The preferred embodiment includes two augers, although again, only one may be placed on the mast 15. The augers shown in FIG. 2 are of opposite hand so that the torque of rotation of the two tends to cancel rather than reinforce and placing a twisting torque on the mast 15.

The foregoing is directed to the preferred embodiment but the scope of the present invention is determined by the claims which are appended hereto.

I claim:

1. An apparatus for creating a seismic shock wave to be propogated through the earth in seismic investigations comprising:
    an auger means having:
        a helical flite thereon which is adapted to enter the earth on rotation;
        an elongate body having means for receiving at least two pneumatically operable sonic shock wave creating means, said sonic means cooperative with said auger means and having an opening from said body to the exterior of said body for directing sonic energy into the earth below the earth's surface.

2. The apparatus of claim 1 wherein said auger means includes an elongate hollow body.

3. The apparatus of claim 1 wherein said auger means includes an elongate hollow body having a chamber means for receiving said sonic shock wave creating means.

4. The apparatus of claim 1 wherein said sonic means is pneumatically operated and said auger means is rotated to advance into the earth, and including a swievel means in a pneumatic line from the exterior of said auger means to said sonic means in the body of said auger means.

5. The apparatus of claim 1 where said sonic means is electrically operated and said auger means is rotated to advance into the earth, and including a swivel means in an electrical line from the exterior of said auger means to said sonic means in the body of said auger means.

6. The apparatus of claim 1 wherein said sonic means includes
    a chamber for storing air under pressure;
    a valve opening into said chamber;
    an electrically operated valve operator connected to said valve; and
    an opening through said body communicating from said chamber to the exterior of said body for directing sonic energy to the earth below its surface.

7. The apparatus of claim 6 including in said valve a seat cooperatively closing said chamber, and including means closing said valve element after opening for a specified interval.

* * * * *